United States Patent
Clifton et al.

(10) Patent No.: US 7,278,320 B1
(45) Date of Patent: Oct. 9, 2007

(54) OMNI-DIRECTIONAL PRESSURE PICKUP PROBE

(75) Inventors: James G. Clifton, Chandler, AZ (US); Dori M. Marshall, Mesa, AZ (US); David B. Tornquist, Chandler, AZ (US); Richard R. Hopkins, Apache Junction, AZ (US); Paul W. Banta, Phoenix, AZ (US); Justin A. Tanner, Chandler, AZ (US)

(73) Assignee: Honeywell International, Inc., Morristown, NJ (US)

( * ) Notice: Subject to any disclaimer, the term of this patent is extended or adjusted under 35 U.S.C. 154(b) by 0 days.

(21) Appl. No.: 11/390,917

(22) Filed: Mar. 27, 2006

(51) Int. Cl.
*G01L 15/00* (2006.01)

(52) U.S. Cl. .......................... 73/736; 73/866.5
(58) Field of Classification Search ................... 73/736, 73/866.5
See application file for complete search history.

(56) References Cited

U.S. PATENT DOCUMENTS

| | | | |
|---|---|---|---|
| 3,581,565 A * | 6/1971 | Dieterich | ................. 73/861.66 |
| 4,357,859 A | 11/1982 | Preston et al. | |
| 4,665,740 A | 5/1987 | Matsumoto et al. | |
| 4,709,581 A | 12/1987 | Nishimura et al. | |
| 4,779,852 A | 10/1988 | Wassell | |
| 5,127,173 A | 7/1992 | Thurston et al. | |
| 5,614,681 A | 3/1997 | Tada | |
| 5,666,998 A | 9/1997 | De Jager et al. | |
| 5,756,892 A * | 5/1998 | Porro et al. | .................... 73/147 |
| 6,084,420 A | 7/2000 | Chee | |
| 6,314,821 B1 | 11/2001 | Allan | |
| 6,370,788 B1 | 4/2002 | Hellier et al. | |
| 6,470,755 B1 * | 10/2002 | Beachey et al. | .............. 73/756 |
| 6,850,059 B2 | 2/2005 | Barron et al. | |
| 6,912,919 B2 | 7/2005 | Shiba et al. | |

* cited by examiner

*Primary Examiner*—Edward Lefkowitz
*Assistant Examiner*—Jermaine Jenkins
(74) *Attorney, Agent, or Firm*—Ingrassia Fisher & Lorenz

(57) ABSTRACT

A pressure pickup probe assembly includes a probe housing, a plurality of openings, and a pickup probe. The probe housing is configured to be mounted within, and extend at least substantially across, a flow passage. The probe housing further includes at least an inner surface and an outer surface. The probe housing inner surface defines at least a plenum therein. The plurality of openings is formed in the probe housing, and each opening extends between the probe housing inner and outer surfaces and is in fluid communication with the probe housing plenum. The pickup probe is disposed at least partially within the probe housing, and has at least a first end, a second end, and a bore extending between the first and second ends and that is in fluid communication with the probe housing plenum.

17 Claims, 3 Drawing Sheets

OMNI-DIRECTIONAL PRESSURE PICKUP PROBE

TECHNICAL FIELD

The present invention relates to pressure measurement and, more particularly, to an improved pressure pickup probe assembly.

BACKGROUND

Systems and methods for measuring and controlling fluid flow in a system are found in various industries. For example, various air distribution systems in commercial aircraft include various devices for measuring and controlling the flow of air through numerous branch lines that feed different portions of the aircraft. The flow of air through these branch lines is, in many instances controlled by a control valve, in response to a flowrate measurement.

For example, one or more of the branch lines in an aircraft air distribution system may include a duct having a flow venturi disposed therein. A flow venturi, as is generally known, may be used to sense fluid flowrate, and typically includes an upstream convergent section, a downstream divergent section, and an interposed flow constricting throat. The change in cross-sectional flow area in the flow venturi causes a pressure change between the convergent section and the flow constricting throat. This change in pressure is sensed and is used to measure fluid flowrate through the duct. In response to the measured flowrate, a control valve, which may be mounted on the duct downstream of the flow venturi, may then be positioned to control the fluid flowrate to a commanded magnitude.

In some systems, including various ones of the aircraft air distribution systems mentioned above, increased flowrate measurement accuracy and controllability is being demanded. In some systems such demands may be realized by reducing the cross sectional flow area of the interposed constricting throat in the existing flow venturi. However, many conventional techniques for reducing the cross sectional flow area a sufficient amount to meet the increased flowrate measurement accuracy and controllability demands may rely on significant redesign of the flow duct, which can be relatively costly and time consuming.

Hence, there is a need for a method of reducing the cross sectional flow area of a venturi flow constricting throat a sufficient amount to meet increased flowrate measurement accuracy and controllability demands that does not rely on a relatively costly and/or time consuming redesign. The present invention addresses at least this need.

BRIEF SUMMARY

The present invention provides a pressure pickup probe assembly that sufficiently reduces the cross sectional flow area of a venturi flow constricting throat to meet increased flowrate measurement accuracy and controllability demands.

In one embodiment, and by way of example only, a pressure pickup probe assembly includes a probe housing, a plurality of openings, and a pickup probe. The probe housing is configured to be mounted within, and extend at least substantially across, a flow passage. The probe housing further includes at least an inner surface and an outer surface. The probe housing inner surface defines at least a plenum therein. The plurality of openings is formed in the probe housing, and each opening extends between the probe housing inner and outer surfaces and is in fluid communication with the probe housing plenum. The pickup probe is disposed at least partially within the probe housing, and has at least a first end, a second end, and a bore extending between the first and second ends and that is in fluid communication with the probe housing plenum.

In another exemplary embodiment, a valve assembly includes a duct, a valve element, and a pressure pickup probe assembly. The duct has an inlet port, an outlet port, and an inner wall that defines a flow venturi between the inlet and outlet ports. The flow venturi has an upstream convergent end, a downstream divergent end, and a flow constricting throat disposed therebetween. The valve element is mounted in the duct downstream of the flow venturi. The pressure pickup probe assembly is coupled to the duct and includes a probe housing, a plurality of openings, and a pickup probe. The probe housing is disposed within, and extends at least substantially across, the flow constricting throat, and has at least an inner surface, which defines at least a plenum therein, and an outer surface. The plurality of openings is formed in the probe housing, and each opening extends between the probe housing inner and outer surfaces and is in fluid communication with the probe housing plenum. The pickup probe is disposed at least partially within the probe housing, and has at least a first end, a second end, and a bore extending between the first and second ends and that is in fluid communication with the probe housing plenum.

Other independent features and advantages of the preferred pressure pickup probe will become apparent from the following detailed description, taken in conjunction with the accompanying drawings which illustrate, by way of example, the principles of the invention.

DETAILED DESCRIPTION OF A PREFERRED EMBODIMENT

The following detailed description is merely exemplary in nature and is not intended to limit the invention or the application and uses of the invention. Furthermore, there is no intention to be bound by any theory presented in the preceding background or the following detailed description. Thus, although the present embodiment is, for convenience of explanation, depicted and described as a flow control valve with a system that is used to determine and control mass flow rate, it will be appreciated that it can be used to determine and control other fluid flow properties, such as volumetric flow rate and heat flow rate.

Figure 1:
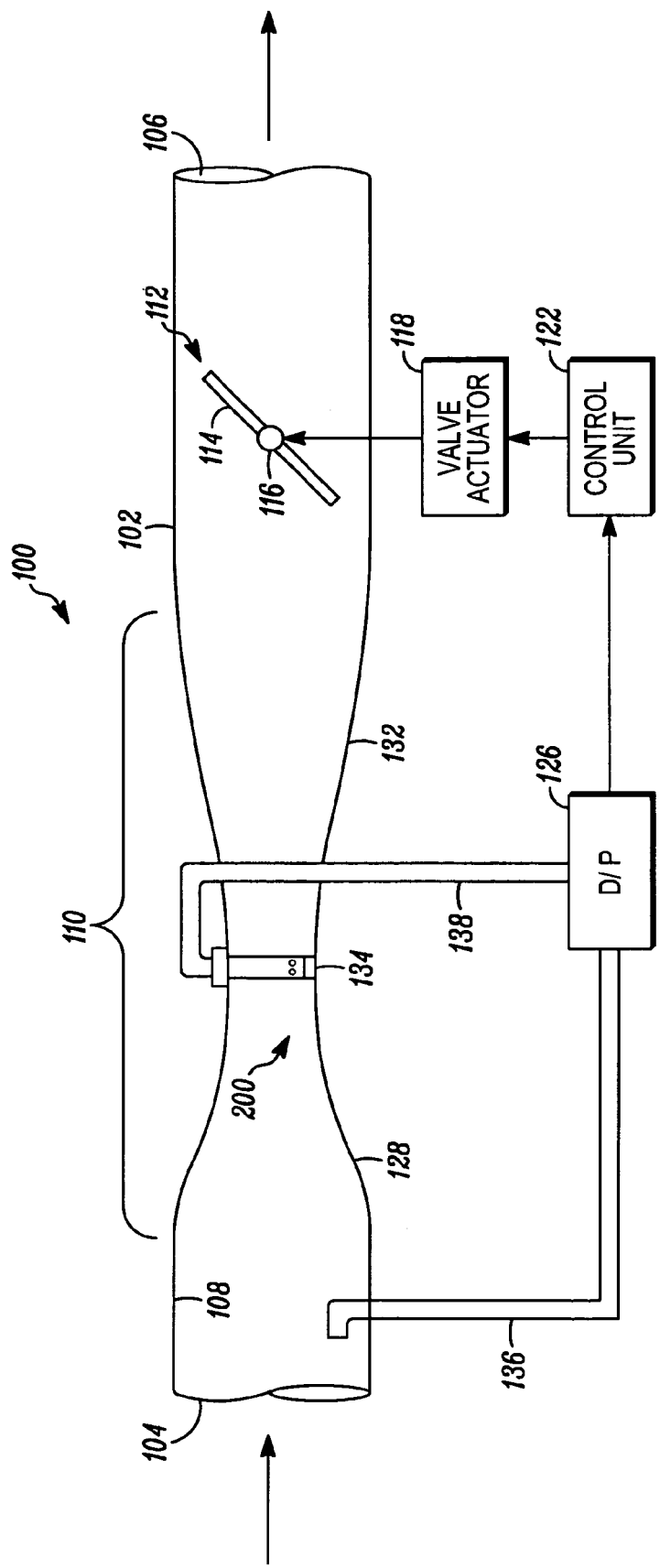
FIG. 1 is a simplified schematic representation of a flow control valve assembly according to an embodiment of the present invention.

Turning now to FIG. 1, a schematic representation of a flow control valve assembly 100 is depicted. The flow control valve assembly 100 includes a duct 102 that has an inlet port 104, an outlet port 106, and an inner wall 108 that defines a flow venturi 110 between the inlet 104 and outlet 106 ports. The fluid whose flowrate is being controlled flows into the inlet port 104, through the flow venturi 110, and exits the outlet port 106. It will be appreciated that the valve assembly 100 could be configured to measure and control the flowrate of various types of fluid, including both liquids and gasses. In a preferred embodiment, however, the fluid is a gas, such as air.

The flow rate of the gas through the duct 102 is controlled by a valve element 112, which, in the depicted embodiment, is a butterfly valve gate 112. The butterfly valve gate 112 includes a valve disk 114 that is mounted on a shaft 116, which is in turn rotationally mounted within the duct 102. The flow rate of the gas through the duct 102 may be varied by changing the angular position of the butterfly valve gate 112. Specifically, the butterfly valve gate 112 may be moved between a closed position and a fully-open position. In the closed position the disk 114 is oriented substantially perpendicular to the gas flow path, thus blocking gas flow through the duct 102. In the fully-open position the disk 114 is oriented substantially parallel to the gas flow path, thus presenting less resistance to gas flow through the duct 102. It will be appreciated that other types of valve elements may be used including, but not limited to, poppet valves, ball valves, and sleeve valves.

The position of the valve gate 112 is controlled by a valve actuator 118 that receives a position control signal from a control unit 122. The valve actuator 118 may be any one of numerous types of valve actuation devices known in the art including an electric, pneumatic, or hydraulic actuator, which may be directly coupled to the shaft 116 or coupled to the shaft 116 via one or more gears or linkages. The control unit 122 determines the flowrate of gas through the duct 102 based on differential pressure that is sensed in the duct 102. The control unit 122 compares the determined flowrate to a desired or commanded flowrate, and positions the butterfly valve gate 112, via the valve actuator 118, as needed to achieve the desired or commanded flowrate. For completeness, the device used to sense differential pressure will now be briefly described.

Differential pressure in the duct 102 is sensed using the flow venturi 110 and a differential pressure sensor 126. The flow venturi 110, as is generally known, includes an upstream convergent section 128, a downstream divergent section 132, and an interposed flow constricting throat 134. The differential pressure 126 is coupled to the flow venturi via two conduits, an upstream pressure pickup conduit 136 and a downstream pressure pickup conduit 138. The upstream pressure pickup conduit 136 extends into the duct 102 preferably upstream of the flow venturi convergent section 128, and the downstream pressure pickup conduit 132 is coupled to a pressure pickup probe assembly 200 that is disposed in the flow venturi flow constricting throat 134. It will be appreciated that the differential pressure sensor 126 may be any one of numerous devices known in the art for sensing differential pressure, and may also be comprised of a single sensor or dual pressure sensors. Some non-limiting examples of a suitable differential pressure sensor include a capacitance sensor, a strain gauge sensor, and a thermal sensor.

Figure 2:
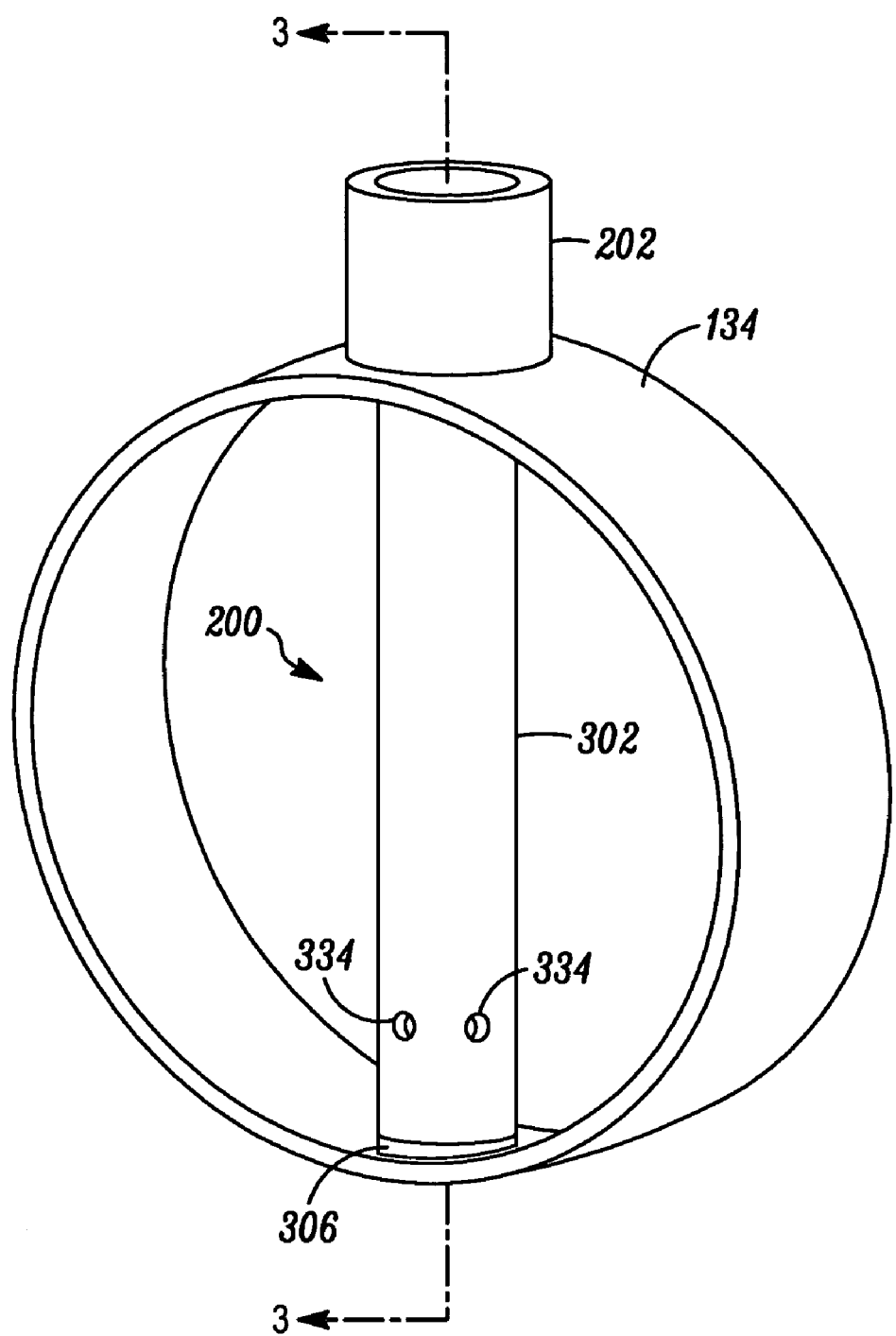
FIG. 2 is a perspective view of a pressure pickup probe assembly according to an exemplary embodiment of the present invention that may be used in the flow control valve assembly of FIG. 1, depicting the pressure pickup probe assembly installed in a venturi flow constricting throat.
Figure 3:
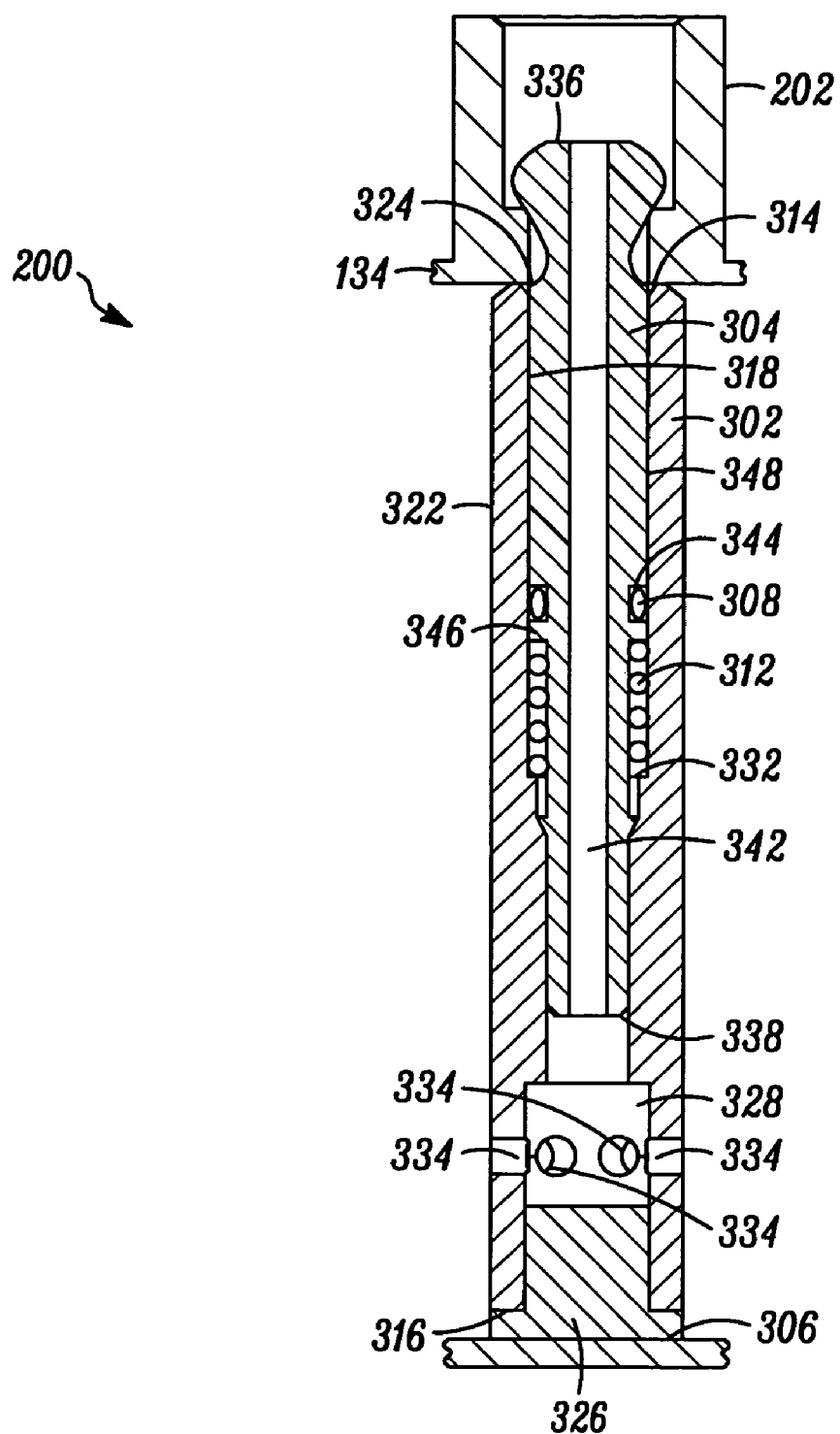
FIG. 3 is a cross section view of the pressure pickup probe assembly taken along line 3-3 of FIG. 2.

The pressure pickup probe assembly 200 that was mentioned above enhances flowrate measurement accuracy and controllability for the valve assembly 100 by providing increased blockage through the flow venturi 110, without having to redesign the duct 102. In addition, and as will be now described in more detail, the pressure pickup probe assembly 200 is configured to withstand vibration, to accommodate manufacturing tolerances and differential thermal expansion, and is insensitive to installation orientation relative to gas flow. With reference now to FIGS. 2 and 3, a detailed description of the pressure pickup probe assembly 200 will now be described.

The pressure pickup probe assembly 200, in both FIGS. 2 and 3, is depicted installed in the venturi flow constricting throat 134. In particular, and with reference first to FIG. 2, it is seen that the probe assembly 200 extends across the venturi flow constricting throat 134 and is at least partially held in place via a non-illustrated threaded fitting that is threaded into a boss 202 formed on the venturi flow constricting throat 134. In the depicted embodiment, the pressure pickup probe assembly 200 is at least substantially cylindrical in shape, and has an outside diameter that is sized to provide the proper blockage. It will be appreciated, however, that the pressure pickup probe assembly 200 could have any one of numerous other shapes. For example, it could have a shape similar to the cross section of an aircraft wing, or any one of numerous other aerodynamic shapes, just to name a few. As is shown most clearly in FIG. 3, the pressure pickup probe assembly 200 includes a probe housing 302, a probe 304, a probe housing plug 306, a seal 308, and a spring 312. With continued reference to FIG. 3, a detailed description of each of these components will now be described.

The probe housing 302 is configured to be mounted within, and extend at least substantially across, the venturi flow constricting throat 134, and has a first end 314, a second end 316, an inner surface 318, and an outer surface 322. The probe housing first and second ends 314 and 316 each have an opening 324 and 326, respectively, formed therein. The probe 304, which is described in more detail further below, extends from the probe housing first end opening 324, and the plug 306 is disposed in the probe housing second end opening 326. The probe housing inner surface 318 defines various features therein, which include a plenum 328 and a spring mount projection 332.

The probe housing 302 further includes a plurality of openings 334 that, at least in the depicted embodiment, are spaced evenly about the perimeter (e.g., the circumference) of the probe housing 302. It will be appreciated, however, that the openings 334 need not be evenly spaced. Each of the openings 334 extends between the probe housing inner and outer surfaces 318 and 322, and each is in fluid communication with the plenum 328 that is defined therein. It will be appreciated that the specific number of openings 334 may vary. Preferably, however, the number of openings 334 is selected so that that the openings 334, in combination with the plenum 328 that each of the openings 334 feeds, makes the pickup probe assembly 200 relatively insensitive to its orientation relative to the direction of gas flowing past the pickup probe assembly 200.

The pickup probe 304 is disposed within the probe housing 302 and includes a first end 336, a second end 338, and a bore 342. The pickup probe first end 336, as alluded to above, extends through the probe housing first end opening 324, into the boss 202, and is held therein via a non-illustrated fitting that threads into the boss 202. The pickup probe bore 342 extends between the pickup probe first and second ends 336 and 338, and is in fluid communication with the probe housing plenum 328. The pickup probe bore 342 is also configured to be fluidly coupled, via the boss 202 and the non-illustrated fitting, to a sensor, such as the previously described differential pressure sensor 126. Thus, the gas pressure in the probe housing plenum 328 is transmitted to the differential pressure sensor 126 via the pickup probe bore 342.

The pickup probe 304 is sized and contoured to slide into the probe housing 302, and to allow for thermally induced expansions and contractions as well as any dimensional mismatches that may be occur during manufacturing. The pickup probe 304 has both a seal groove 344 and a flange 346 formed therein. The seal groove 344 is formed in an outer surface 348 of the pickup probe 304. The seal 308 is disposed within the seal groove 344 and engages the probe housing inner surface 318. The seal 308 provides not only a sealing function between the pickup probe 304 and the probe housing 302, but also supplies vibration dampening that may occur during vibration of the pressure pickup probe assembly 200, to thereby prevent component chafing. It will be appreciated that the seal 308 may be any one of numerous suitable sealing devices, but in the preferred embodiment it is a conventional rubber or silicone o-ring seal.

The spring 312 surrounds the pickup probe 304 and is disposed between the pickup probe housing spring mount projection 332 and the pickup probe flange 346. The spring 312 is preferably a coil spring, though it could be implemented as any one of numerous other types of springs. No matter the particular type of spring that is used, the spring 312 is configured to be in compression when it is installed, thereby biasing the probe housing 302 and pickup probe 304 away from each other.

The spring 312 and the plug 306 together provide various advantages for the pressure pickup probe assembly-200. The plug 306, as was noted above, is disposed within the probe housing second end opening 326. The plug 306, which is preferably formed at least partially of a substantially compliant material, such as rubber, also extends away from the probe housing 302 and engages the venturi flow constricting throat 134. Thus, the plug 306 and the spring 312 together restrict the movement of the pressure pickup probe assembly 200 due to vibration to acceptable levels, yet accommodate differential thermal expansion and contraction, and variations in manufacturing tolerances.

The pressure pickup probe assembly 200 described herein enhances flowrate measurement accuracy and controllability by providing increased blockage through the flow venturi 110, without having to redesign the duct 102. The pressure pickup probe assembly 200 is additionally configured to withstand vibration, to accommodate manufacturing tolerances and differential thermal expansion, and is insensitive to installation orientation relative to gas flow.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. A pressure pickup probe assembly, comprising:
a probe housing configured to be mounted within, and extend at least substantially across, a flow passage, the probe housing having at least an inner surface and an outer surface, the probe housing inner surface defining at least a plenum therein;
a plurality of openings formed in the probe housing, each opening extending between the probe housing inner and outer surfaces and in fluid communication with the probe housing plenum; and
a pickup probe disposed at least partially within the probe housing, the pickup probe having at least a first end, a second end, and a bore extending between the first and second ends and in fluid communication with the probe housing plenum a spring disposed between the probe housing inner surface and the pickup probe, the spring configured to bias the probe housing and the pickup probe away from each other.

2. The assembly of claim 1, wherein:
the probe housing further includes a first end and a second end, each having an opening formed therein; and
the pickup probe first end extends through the opening in the probe housing first end.

3. The assembly of claim 2, further comprising:
a plug disposed within, and configured to fluidly seal, the opening in the probe housing second end.

4. The assembly of claim 3, wherein the plug is formed at least partially of a substantially compliant material.

5. The assembly of claim 1, wherein the plurality of openings are spaced evenly about a perimeter of the probe housing.

6. The assembly of claim 1, wherein:
the probe housing inner surface further defines a spring mount projection;
the pickup probe further includes a flange extending from an outer surface thereof; and
the spring is disposed between the probe housing spring mount projection and the pickup probe flange.

7. The assembly of claim 1, further comprising:
a seal surrounding the pickup probe and engaging the probe housing inner surface.

8. The assembly of claim 7, wherein:
the pickup probe further includes a seal groove formed in an outer surface thereof; and
the seal is disposed at least partially within the pickup probe seal groove.

9. The assembly of claim 1, wherein:
the probe housing plenum has a first inner diameter;
the probe housing inner surface further defines a pickup probe receptacle, the pickup probe receptacle in fluid communication with the probe housing plenum and having a second inner diameter at least a portion of which is less than the first inner diameter; and
the pickup probe is disposed at least partially within the probe housing pickup probe receptacle.

10. A pressure pickup probe assembly, comprising:
a probe housing configured to be mounted within, and extend at least substantially across, a flow passage, the probe housing having at least, a first end, a second end, an inner surface, and an outer surface, the probe housing first and second ends each having an opening formed therein, the probe housing inner surface defining at least a plenum in the probe housing;
a plurality of openings formed in the probe housing, each opening extending between the probe housing inner and outer surfaces and in fluid communication with the probe housing plenum;
a pickup probe disposed at least partially within the probe housing, the probe having at least a first end, a second end, and a bore extending between the first and second ends thereof, the pickup probe first end extending through the opening in the probe housing first end, the pickup probe bore in fluid communication with the probe housing plenum; and
a plug disposed within, and configured to fluidly seal, the opening in the probe housing second end a spring disposed between the probe housing inner surface and the pickup probe, the spring configured to bias the probe housing and the pickup probe away from each other.

11. The assembly of claim 10, wherein:
the probe housing inner surface further defines a projection;
the plurality of openings are spaced evenly about a perimeter of the probe housing;
the pickup probe further includes a flange extending from an outer surface thereof; and
the spring is disposed between the probe housing projection and the pickup probe flange.

12. The assembly of claim 10, further comprising:
a seal groove formed in an outer surface of the pickup probe; and
a seal disposed at least partially within the pickup probe seal groove and engaging the probe housing inner surface.

13. The assembly of claim 10, wherein:
the probe housing plenum has a first inner diameter;
the probe housing inner surface further defines a pickup probe receptacle, the pickup probe receptacle in fluid communication with the probe housing plenum and having a second inner diameter at least a portion of which is less than the first inner diameter; and
the pickup probe is disposed at least partially within the probe housing pickup probe receptacle.

14. A valve assembly, comprising:
a duct having an inlet port, an outlet port, and inner wall that defines a flow venturi between the inlet and outlet ports, the flow venturi having an upstream convergent section, a downstream divergent section, and a flow constricting throat disposed therebetween;
a valve element mounted in the duct downstream of the flow venturi; and
a pressure pickup probe assembly coupled to the duct, the pressure pickup probe assembly including:
a probe housing disposed within, and extending at least substantially across, the flow constricting throat, the probe housing having at least an inner surface and an outer surface, the probe housing inner surface defining at least a plenum therein,
a plurality of openings spaced evenly about a perimeter of the probe housing, each opening extending between the probe housing inner and outer surfaces and in fluid communication with the probe housing plenum, and
a pickup probe disposed at least partially within the probe housing, the probe having at least a first end, a second end, and a bore extending between the first and second ends and in fluid communication with the probe housing plenum a spring disposed between the probe housing inner surface and the pickup probe, the spring configured to bias the probe housing and the pickup probe away from each other.

15. The valve assembly of claim 14, wherein:
the duct further includes an outer wall, and a probe opening extending between the duct inner and outer wall and in fluid communication with the flow constricting throat;
the plurality of openings are spaced evenly about a perimeter of the probe housing;
the probe housing further includes a first end and a second end, each having an opening formed therein; and
the pickup probe first end extends through the opening in the probe housing first end.

16. The valve assembly of claim 15, further comprising:
a plug formed at least partially of a substantially compliant material, the plug engaging the duct inner wall and disposed at least partially within, and configured to fluidly seal, the opening in the probe housing second end.

17. The valve assembly of claim 14, further comprising:
a seal surrounding the pickup probe and engaging the probe housing inner surface.

* * * * *